United States Patent
Swanson et al.

(10) Patent No.: US 7,090,169 B2
(45) Date of Patent: Aug. 15, 2006

(54) RETAINING CLAMP FOR ALIGNMENT OF RISERS WHEN PACKING A PARACHUTE

(76) Inventors: Curt Swanson, 26798 Silver Oaks Dr., Murrieta, CA (US) 92563; Jack Gershfeld, 615 Del Rio Way, Fullerton, CA (US) 92835

( * ) Notice: Subject to any disclaimer, the term of this patent is extended or adjusted under 35 U.S.C. 154(b) by 150 days.

(21) Appl. No.: 10/848,858

(22) Filed: May 20, 2004

(65) Prior Publication Data

US 2005/0269457 A1    Dec. 8, 2005

(51) Int. Cl.
*B64D 17/00* (2006.01)
(52) U.S. Cl. .................................... 244/142
(58) Field of Classification Search ........ 244/142–152; 270/41; 223/37; 248/65–74.5
See application file for complete search history.

(56) References Cited

U.S. PATENT DOCUMENTS

| | | | | |
|---|---|---|---|---|
| 942,007 | A * | 11/1909 | Morrill ..................... 24/129 R |
| 1,403,984 | A * | 1/1922 | Smith ..................... 244/151 R |
| 1,712,307 | A * | 5/1929 | McClintock ................ 244/148 |
| 1,783,452 | A * | 12/1930 | Reed .......................... 244/150 |
| 1,930,942 | A * | 10/1933 | Pringle ........................... 5/419 |
| 2,019,692 | A * | 11/1935 | Mueller ..................... 160/229.1 |
| 2,046,387 | A * | 7/1936 | Knight ......................... 244/145 |
| 2,508,754 | A * | 5/1950 | Frieder et al. ............... 244/148 |
| 2,583,905 | A * | 1/1952 | Thompson .................. 244/148 |
| 2,621,384 | A * | 12/1952 | Slaughter .................... 248/137 |
| 2,637,464 | A * | 5/1953 | Vogel, Jr. .................... 220/669 |
| 2,821,762 | A * | 2/1958 | Foose .......................... 24/459 |
| 2,896,885 | A * | 7/1959 | Moy et al. .................. 244/149 |
| 2,936,138 | A * | 5/1960 | Stencel ....................... 244/148 |
| 3,011,820 | A * | 12/1961 | Frieder et al. ................ 294/77 |
| 3,262,660 | A * | 7/1966 | Morrell et al. .............. 244/148 |
| 3,387,341 | A * | 6/1968 | Mates et al. ................... 24/306 |
| 3,576,304 | A * | 4/1971 | Gillemot et al. ............ 248/74.2 |
| 3,774,249 | A * | 11/1973 | Ybarra et al. ................... 5/419 |
| 3,848,839 | A * | 11/1974 | Tillman ..................... 248/74.2 |
| 5,060,943 | A * | 10/1991 | Stoffo .......................... 401/195 |
| 5,170,984 | A * | 12/1992 | Ruckwardt .................. 248/635 |
| 5,209,441 | A * | 5/1993 | Satoh ......................... 248/74.2 |
| 5,316,245 | A * | 5/1994 | Ruckwardt ................. 248/68.1 |
| D354,904 | S * | 1/1995 | Halsten ....................... D8/356 |
| 5,458,303 | A * | 10/1995 | Ruckwardt ................. 248/74.2 |
| 5,669,590 | A * | 9/1997 | Przewodek ................. 248/68.1 |
| 5,785,219 | A * | 7/1998 | Kraft ........................... 224/576 |
| 5,931,423 | A * | 8/1999 | Heideloff .................... 248/74.4 |

(Continued)

OTHER PUBLICATIONS www.orientalrugsandkilims.com/rugguide/history.htm, pp. 1/1.*

*Primary Examiner*—Teri Pham Luu
*Assistant Examiner*—S. A. Holzen
(74) *Attorney, Agent, or Firm*—Vladimir Khiterer

(57) ABSTRACT

A retaining clamp for alignment of risers when packing a parachute is disclosed. The retaining clamp comprises a base with three prongs defining bores for receiving and engaging large rings of three-ring release assemblies (three-ring release assemblies are used for cutting off the main parachute canopy in the event of malfunction before deploying the secondary parachute in order to avoid entanglement between the main and secondary parachutes).

The large rings are inserted in the bores, turned and engaged with the bores by way of force of friction. An alternative embodiment of the retaining clamp comprises a base with two prongs defining a bore for receiving and engaging large rings of three-ring release assemblies. Both embodiments can be used in combination with a parachute folding mat.

1 Claim, 7 Drawing Sheets

U.S. PATENT DOCUMENTS

| | | | |
|---|---|---|---|
| 5,941,483 A * | 8/1999 | Baginski | 248/68.1 |
| 5,947,349 A * | 9/1999 | Shaalan | 223/37 |
| D424,924 S * | 5/2000 | Ackerman | D8/396 |
| 6,279,791 B1 * | 8/2001 | Betman et al. | 223/37 |
| 6,341,379 B1 * | 1/2002 | Kokus | 2/89 |
| 6,360,927 B1 * | 3/2002 | Barker | 223/37 |
| 6,431,500 B1 * | 8/2002 | Jacobs et al. | 248/51 |
| D468,996 S * | 1/2003 | Sarkinen et al. | D8/356 |
| 6,536,982 B1 * | 3/2003 | Gibbons et al. | 403/97 |
| 6,540,186 B1 * | 4/2003 | Fischer | 248/205.2 |
| 6,588,078 B1 * | 7/2003 | Writt et al. | 24/712.2 |
| D490,692 S * | 6/2004 | Williams | D8/356 |
| 6,786,947 B1 * | 9/2004 | Mountford | 55/367 |
| 6,802,092 B1 * | 10/2004 | Klein | 5/420 |
| 6,814,269 B1 * | 11/2004 | Fernandez | 223/37 |
| 6,883,761 B1 * | 4/2005 | Boon et al. | 248/74.1 |
| 6,915,990 B1 * | 7/2005 | Maruyama | 248/68.1 |
| 6,922,911 B1 * | 8/2005 | Lam | 34/239 |
| 6,926,237 B1 * | 8/2005 | Shereyk et al. | 248/71 |
| 2002/0008384 A1 * | 1/2002 | Potts et al. | 285/124.1 |
| 2003/0024088 A1 * | 2/2003 | Writt et al. | 24/712.2 |

* cited by examiner

RETAINING CLAMP FOR ALIGNMENT OF RISERS WHEN PACKING A PARACHUTE

BACKGROUND OF THE INVENTION

The present invention pertains to a retaining clamp for alignment of risers when packing a parachute. It is well known to the persons knowledgeable in the pertinent arts that a skydiver's life and survival depend on correctly packing a parachute. One of the rules that must be strictly followed when packing a parachute is aligning the risers, i.e. the lines that attach the parachute canopy to the harness/container attached to the body of the skydiver. Proper alignment of risers is important for proper operation of the parachute during opening. If risers are not aligned properly during packaging, during opening the parachute may develop line twists and the opening will not be on heading. Line twists in high performance parachutes may result in the necessity off cutting away the main parachute and deploying the reserve.

Most modern parachutes employ the three-ring release assembly for cutting away the main parachute canopy in the event of malfunction before deploying the secondary parachute. The three-ring assembly reduces the pull force required to cut away the main parachute followed by deployment of the reserve parachute. The main parachute must be cut away before deploying the reserve parachute to avoid entanglement between the main and reserve parachutes.

The three-ring release assembly comprises three interlocking rings (the large, medium and small rings) which attach the risers (and the main canopy) to the harness/container. They can be rapidly disconnected in the event of a main parachute malfunction by way of pulling a cord. The large ring has a central bore, a tapered circumference and ring width which is usually uniform throughout the ring.

Conventionally, when packing a parachute, the risers are aligned by tying the large rings together with a ribbon or a rope. However, tying and untying a ribbon or rope can be time consuming and inconvenient.

What is needed is the simple and inexpensive device for alignment of risers when packing a parachute.

SUMMARY OF THE INVENTION

The retaining clamp for alignment of risers when packing a parachute satisfies this need. The first embodiment comprises a base with three prongs defining bores for receiving and engaging the large rings of the three-ring release assemblies, such that the large rings are inserted in the bores, turned and engaged with the bores by way of force of friction.

The second embodiment of this invention comprises a base with two prongs defining a bore for receiving and engaging the large rings of the three-ring release assemblies.

BRIEF DESCRIPTION OF THE DRAWINGS FIGURES

DETAILED DESCRIPTION OF THE PREFERRED EMBODIMENTS

Figure 1:
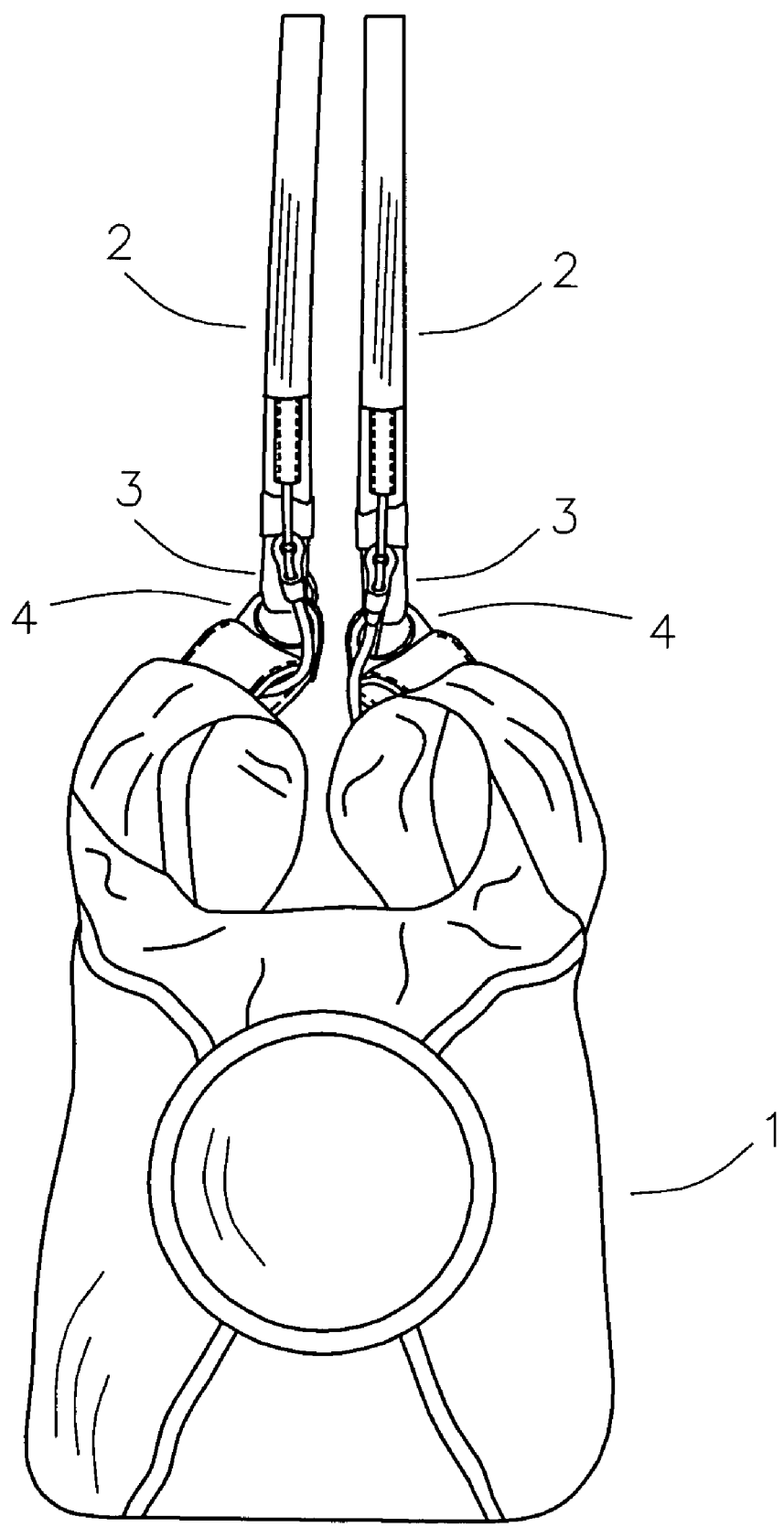
FIG. 1 shows a packed parachute with aligned risers.
Figure 2:
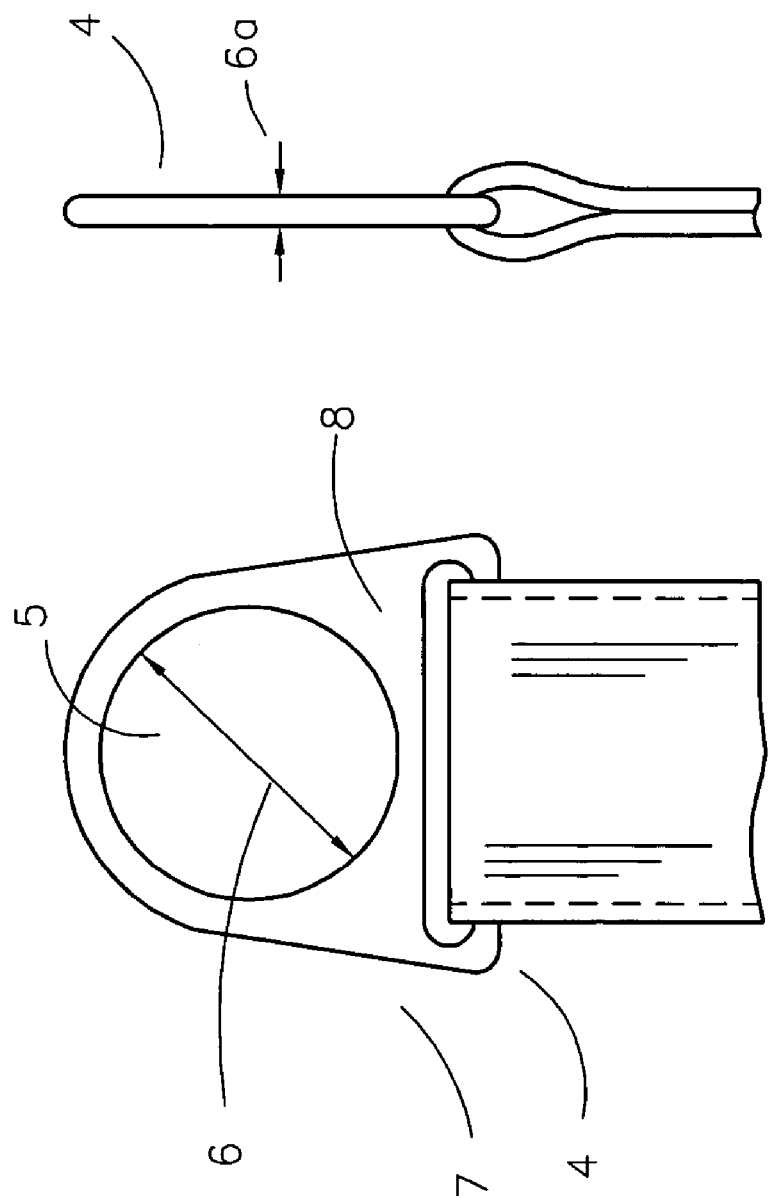
FIG. 2 shows a large ring of a three-ring release assembly.

This invention will be better understood with the reference to the drawing figures FIG. 1 through FIG. 7. The same numerals refer to the same elements in all drawing figures.

Viewing FIG. 1, numeral 1 indicates a container that contains a parachute. Numeral 2 indicates a riser. Risers 2 are the lines that attach the parachute canopy to container 1, which in turn is attached to the body of the skydiver.

Numeral 3 indicates three-ring release assembly. Three-ring release assembly 3 is used for cutting away the main parachute canopy in the event of malfunction before deploying the reserve parachute. This is necessary to avoid entanglement between the main and reserve parachutes. Three-ring release assembly 3 comprises three interlocking rings (the large, medium and small rings) which attach risers 2 (and the main canopy) to container 1.

Three-ring release assembly 3 can be rapidly disconnected in the event of a main parachute malfunction by way of pulling a cord. The three-ring assembly reduces the pull force required to cut away the main parachute followed by deployment of the reserve parachute.

The large ring of three-ring release assembly 3 is indicated by numeral 4. Large ring 4 is shown separately in FIG. 2. Viewing now FIG. 2, large ring 4 has a central bore indicated by numeral 5. Central bore 5 has a diameter indicated by numeral 6. Large ring 4 has a tapered circumference indicated by numeral 7. Tapered circumference 7 has its widest point indicated by numeral 8. Numeral 6a indicates ring width. Ring width 6a is usually uniform throughout large ring 4.

Figure 3:
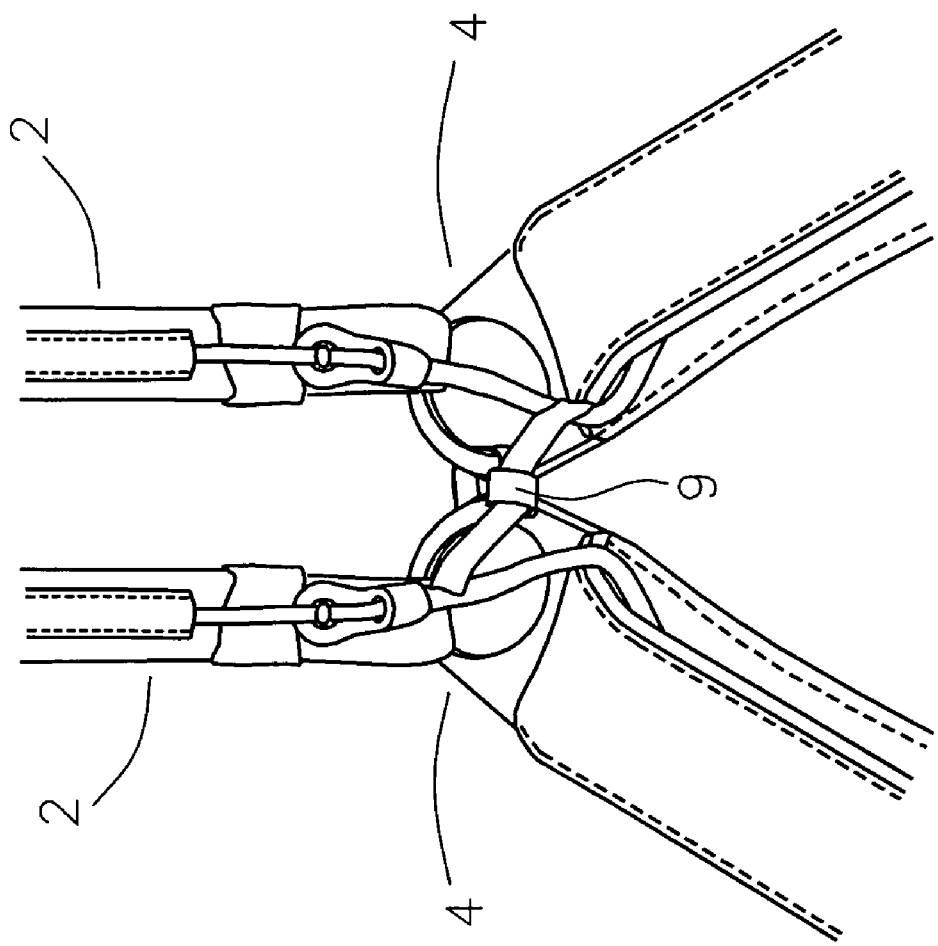
FIG. 3 shows the prior art method of aligning risers by tying them with a ribbon.

Viewing now FIG. 3, there is shown the prior art method of aligning risers by tying them with a ribbon. Numeral 9 indicates a ribbon. Ribbon 9 is tied to large rings 4, causing risers 2 to be aligned.

Figure 4:
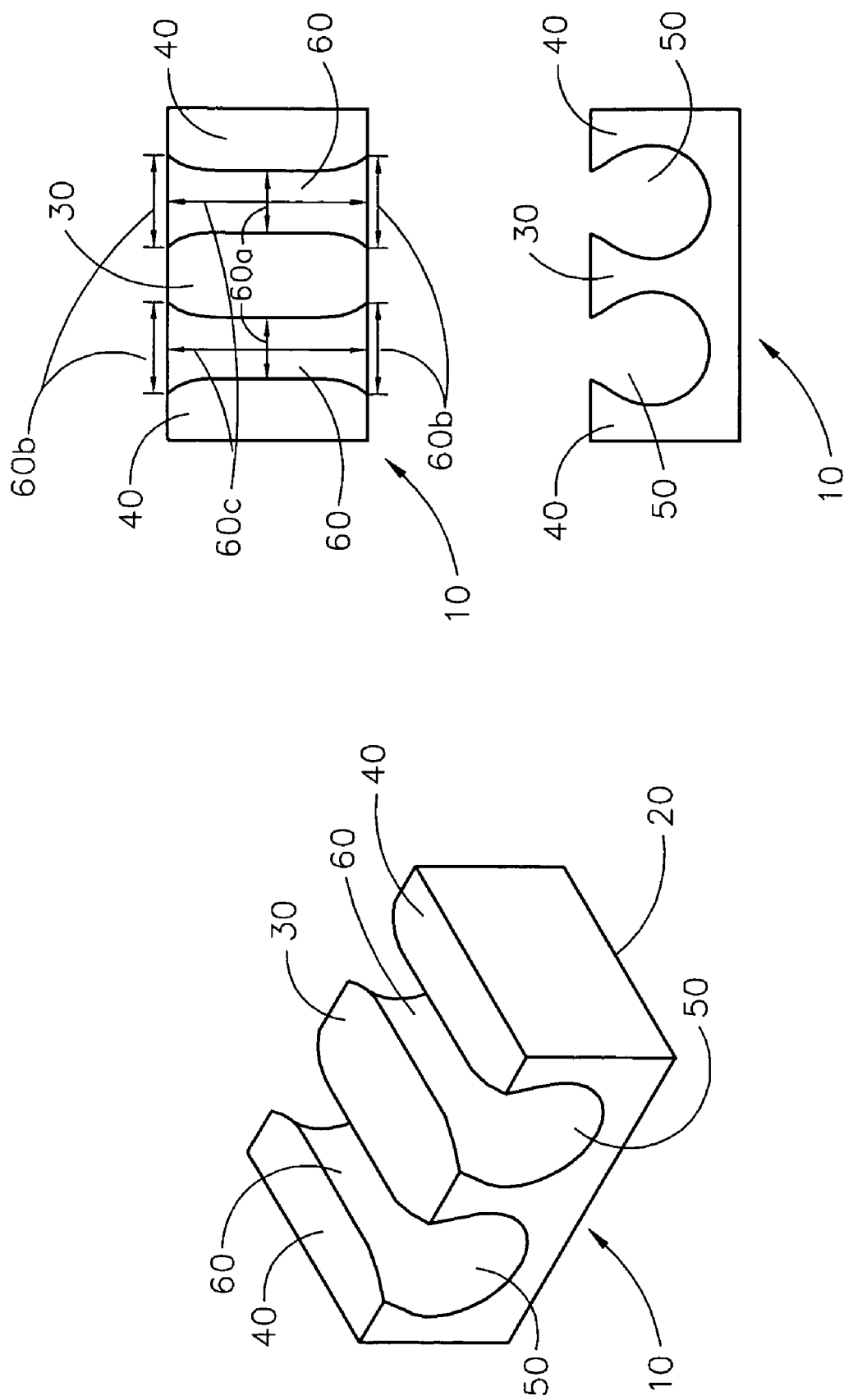
FIG. 4 shows a retaining clamp according to the first embodiment of the present invention.

Viewing now FIG. 4, there is shown a retaining clamp indicated by numeral 10. Retaining clamp 10 is shown in isometric, top plan and front elevation views. Retaining clamp 10 comprises a substantially rectangular base indicated by numeral 20. Numeral 30 indicates a middle prong. Numeral 40 indicates a pair of side prongs. Side prongs 40 are disposed on opposite ends of base 20. Middle prong 30 is disposed in the middle of base 20 between side prongs 40.

Retaining clamp 10 is made from rubber, plastic or other suitable resilient material.

Numeral 50 indicates a pair of elongated bores. Elongated bores 50 are for receiving and engaging large rings 4. Each elongated bore 50 is defined by one of side prongs 40 and middle prong 30. Elongated bore 50 has a substantially cylindrical cross-sectional configuration with a longitudinal axis substantially parallel to base 20.

Further, elongated bore 50 has an open top shaped as a slot indicated by numeral 60. Slot 60 is substantially parallel to the longitudinal axis of elongated bore 50 and extends the length of elongated bore 50. Slot 60 comprises a middle portion indicated by numeral 60a and two opposite end portions indicated by numeral 60b. Numeral 60c indicates the length of elongated bore 50.

Middle portion 60a is slightly larger than ring width 6a. End portion 60b is slightly larger than widest point 8 of tapered circumference 7.

Further, length 60 c is slightly smaller than diameter 6.

Figure 5:
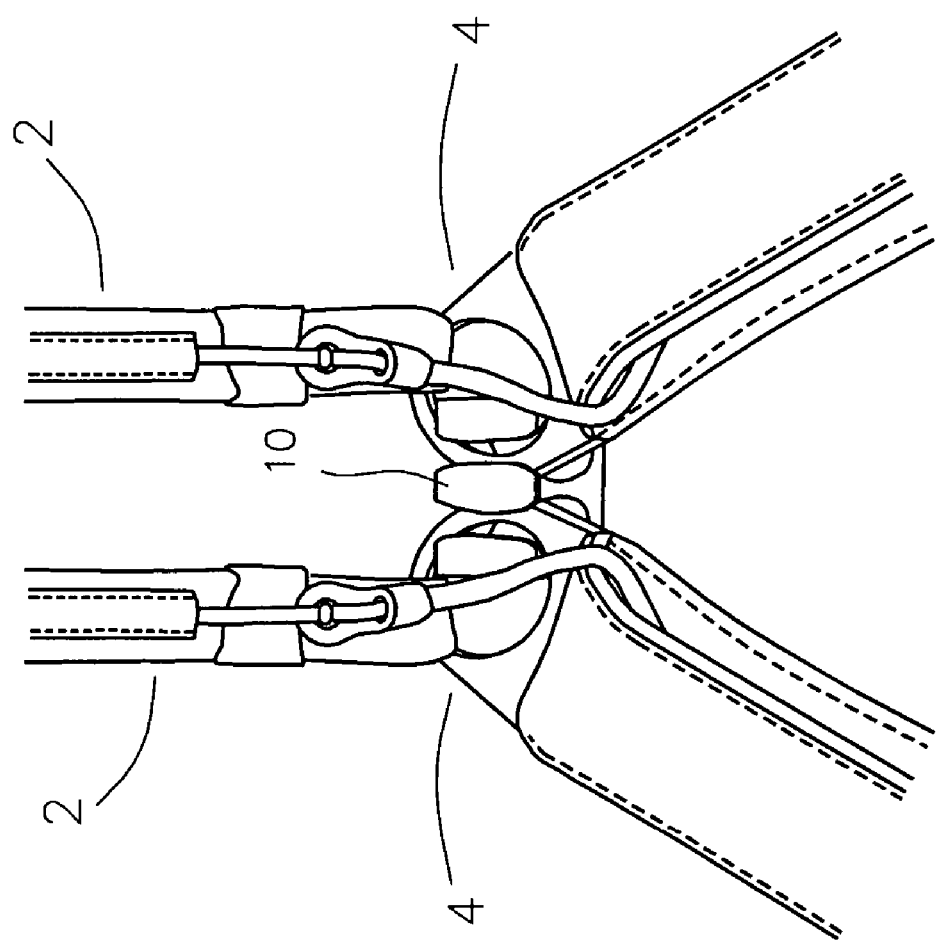
FIG. 5 shows aligning risers according to the first embodiment of the present invention.

Viewing now FIG. 5, there is shown aligning risers according to the first embodiment of the present invention. Large rings 4 are inserted in slots 60 such that middle portions 60a (which are slightly larger than ring widths 6a) receive ring widths 6a. Large rings are then turned around the longitudinal axis of elongated bores 50 such that end portions 60b (which are slightly larger than widest point 8) receive widest points 8 of tapered circumferences 7. Large rings 4 are thus engaged, by way of force of friction, within elongated bores 50. This causes risers 2 to be aligned and the parachute ready for packing.

Figure 6:
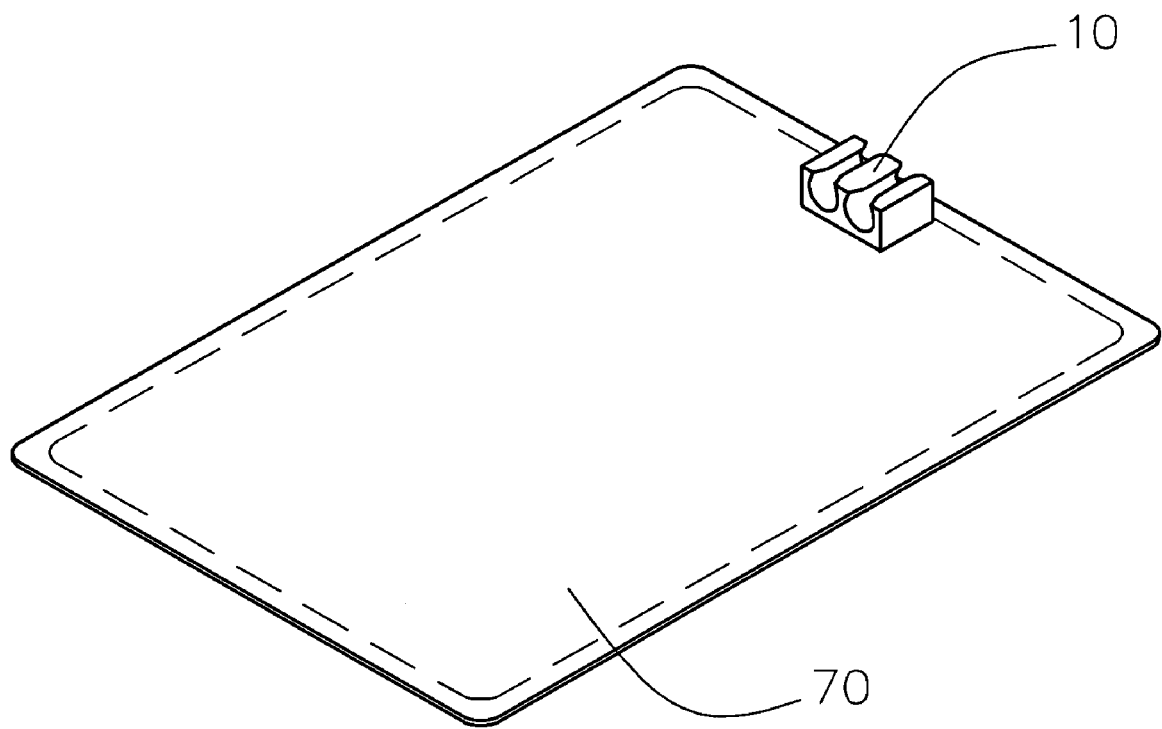
FIG. 6 shows a combination of the retaining clamp with a folding mat according to the first embodiment of the present invention.

Viewing now FIG. 6, there is shown an alternative embodiment of this invention, and specifically a combination of the retaining clamp with a folding mat. As the persons knowledgeable in the pertinent arts will recognize, folding a parachute on a concrete surface causes rubbing of container 1 material against the concrete. Over time, this may cause substantial wear and tear of container 1 material, eventually making container 1 unusable. Folding a parachute on a grass surface may cause container 1 to get wet, if the grass is wet. That is why folding mats are commonly used to protect container 1 during parachute folding.

Numeral 70 indicates a folding mat. Folding mat 70 is fixedly attached to base 20. Folding mat 70 is substantially rectangular and retaining clamp 10 is disposed near a side of folding mat 70 (FIG. 6 shows retaining clamp 10 disposed near the upper right side of folding mat 70). Retaining clamp 10 is disposed on folding mat 70 in such a way that the longitudinal axis of elongated bores 50 are substantially perpendicular to said side. Folding mat 70 is fixedly attached to base 20 by way of screws, glue or any other method known to the persons knowledgeable in the pertinent arts.

Aligning risers is done is the same fashion as described in reference to FIG. 5, except container 1 is placed on top of folding mat 70.

Figure 7:
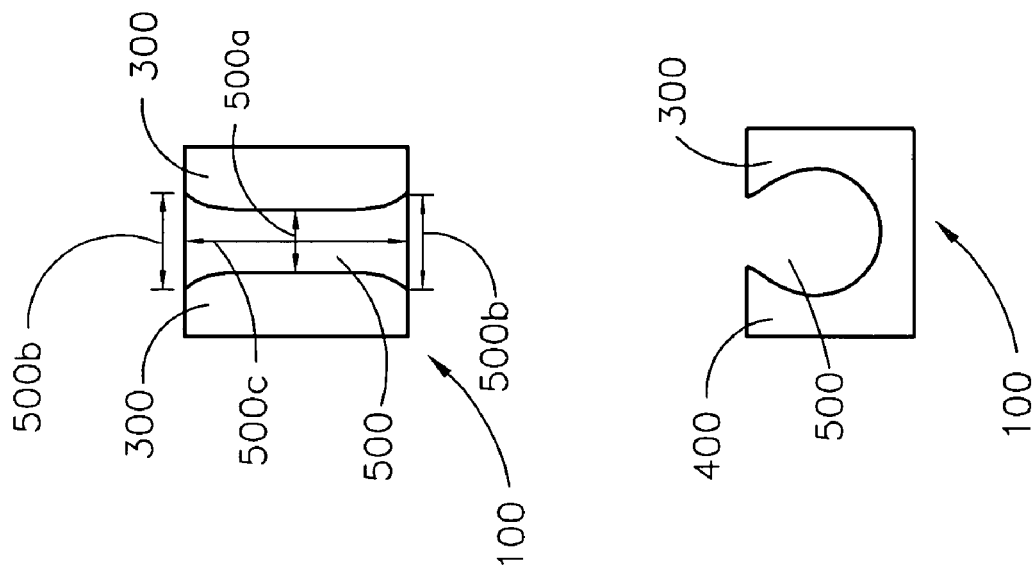
FIG. 7 shows a retaining clamp according to the second embodiment of the present invention.
Figure 7:
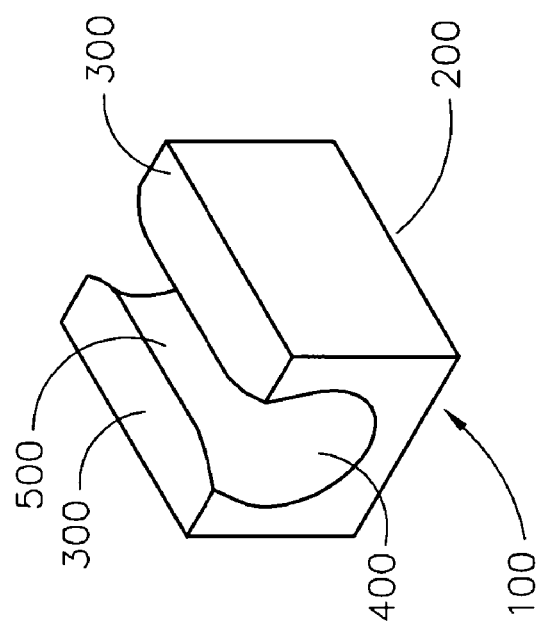

Viewing now FIG. 7, there is shown a retaining clamp indicated by numeral 100. Retaining clamp 100 is shown in isometric, top plan and front elevation views. Retaining clamp 100 comprises a substantially rectangular base indicated by numeral 200. Numeral 300 indicates a pair of prongs. Prongs 300 are disposed on opposite ends of base 200.

Numeral 400 indicates an elongated bore. Elongated bore 400 is for receiving and engaging large rings 4. Elongated bore 400 is defined by prongs 300. Elongated bore 400 has a substantially cylindrical cross-sectional configuration with a longitudinal axis substantially parallel to base 200.

Further, elongated bore 400 has an open top shaped as a slot indicated by numeral 500. Slot 500 is substantially parallel to the longitudinal axis of elongated bore 400 and extends the length of elongated bore 400. Slot 500 comprises a middle portion indicated by numeral 500a and two opposite end portions indicated by numeral 500b. Numeral 500c indicates the length of elongated bore 400.

Middle portion 500a is slightly larger than ring width 6a. End portion 500b is slightly larger than widest point 8 of tapered circumference 7. Further, length 500c is slightly smaller than diameter 6.

Aligning risers according to the second embodiment of the present invention is described below:

Large rings 4 are inserted in slot 500 such that middle portion 500a (which is slightly larger than ring widths 6a) receives ring widths 6a. Large rings are then turned around the longitudinal axis of elongated bore 400 such that end portions 500b (which are slightly larger than widest point 8) receive widest points 8 of tapered circumferences 7. Large rings 4 are thus engaged, by way of force of friction, within elongated bore 400. This causes risers 2 to be aligned and the parachute ready for packing.

Further, similarly to the alternative embodiment described in reference to FIG. 6, the second embodiment described in reference to FIG. 7 can be used in combination with folding mat 70.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A retaining clamp and a folding mat aligning risers when packing a parachute by engaging large rings of three-ring release assemblies, the large rings having a central bore, a tapered circumference and a ring width, the retaining clamp comprising:
   (a) a substantially rectangular base;
   (b) a middle prong;
   (c) a pair of side prongs, wherein the side prongs are disposed on opposite ends of the base and the middle prong is disposed in the middle of the base between the side prongs;
   (d) a pair of elongated bores receiving and engaging the large rings;
      wherein each elongated bore is defined by one of the side prongs and the middle prong, the elongated bore having substantially cylindrical cross-sectional configuration with a longitudinal axis substantially parallel to the base, the elongated bore having an open top shaped as a slot substantially parallel to the longitudinal axis;
      wherein the slot extends the length of the elongated bore, the slot comprising a middle portion and two opposite end portions such that the middle portion is slightly larger than the ring width and each of the end portions is slightly larger than the tapered circumference at its widest point;
      wherein the length of the elongated bore is slightly smaller than the diameter of the central bore;
      wherein the folding mat having a substantially rectangular shape;
      wherein the folding mat is fixedly attached to the base;
      wherein the retaining clamp is disposed near a side of the folding mat such that the longitudinal axis is substantially perpendicular to said side.

* * * * *